US012646367B2

(12) United States Patent
Soendergaard et al.

(10) Patent No.: US 12,646,367 B2
(45) Date of Patent: Jun. 2, 2026

(54) CONCEPT FOR AN ENTRY-EXIT MATCHING SYSTEM

(71) Applicant: Grazper Technologies ApS,
Copenhagen (DK)

(72) Inventors: Ulrik Ishoej Soendergaard,
Copenhagen (DK); Thomas Jakobsen,
Copenhagen (DK)

(73) Assignee: Grazper Technologies ApS,
Koebenhavn (DK)

( * ) Notice: Subject to any disclaimer, the term of this
patent is extended or adjusted under 35
U.S.C. 154(b) by 337 days.

(21) Appl. No.: 17/663,833

(22) Filed: May 18, 2022

(65) Prior Publication Data

US 2022/0392288 A1 Dec. 8, 2022

(30) Foreign Application Priority Data

May 31, 2021 (EP) ..................................... 21176929

(51) Int. Cl.
 *G07C 9/32* (2020.01)
 *G06V 20/52* (2022.01)
 (Continued)

(52) U.S. Cl.
 CPC .............. *G07C 9/32* (2020.01); *G06V 20/52*
 (2022.01); *G06V 40/172* (2022.01); *G06Q*
 *50/40* (2024.01)

(58) Field of Classification Search
 CPC ........ G07C 9/32; G06V 20/52; G06V 40/172;
 G06V 20/59; G06V 40/16; G06Q 50/40
 See application file for complete search history.

(56) References Cited

U.S. PATENT DOCUMENTS 8,615,105 B1 * 12/2013 Cheng .................... G06V 20/52
382/103
10,354,262 B1 * 7/2019 Hershey ................ H04L 67/535
(Continued)

FOREIGN PATENT DOCUMENTS

CN 105913507 A 8/2016
CN 109508690 A 3/2019
(Continued)

OTHER PUBLICATIONS

Komatsu Shunta, et al., Human Flow Estimation with Bipartite
Graph Matching on Bus Camera, 2020 IEICE General Conference,
Mar. 17, 2020.
(Continued)

*Primary Examiner* — Solomon G Bezuayehu
(74) *Attorney, Agent, or Firm* — Sughrue Mion, PLLC

(57) ABSTRACT

Examples relate to a concept for an entry-exit matching
system, and in particular to an evaluation device, a method
and a computer program for person re-identification for
entry-exit matching in a transportation system. The evalu-
ation device comprises processing circuitry configured to
obtain a plurality of re-identification codes. Each re-identi-
fication code represents a person being recorded by at least
one camera when entering or exiting at least a section of the
transportation system. The processing circuitry is configured
to match the plurality of re-identification codes using a
global matching scheme to obtain a plurality of matched
pairs of re-identification codes, such that each matched pair
of re-identification codes comprises a re-identification code
of a person entering and a re-identification code of a person
exiting. The global matching scheme is based on reducing an
overall distance between the re-identification codes of the
matched pairs of re-identification codes over the plurality of
matched pairs of re-identification codes. The processing (Continued)

circuitry is configured to determine points of entry and exit for the plurality of matched pairs of re-identification codes.

16 Claims, 8 Drawing Sheets

(51) Int. Cl.
    *G06V 40/16*        (2022.01)
    *G06Q 50/40*        (2024.01)

(56) References Cited

U.S. PATENT DOCUMENTS

| | | | | |
|---|---|---|---|---|
| 10,586,203 | B1 * | 3/2020 | Maldonado | G06T 7/74 |
| 10,963,893 | B1 * | 3/2021 | Sharma | G06F 18/256 |
| 11,640,708 | B1 * | 5/2023 | Blechschmidt | G06V 20/10 |
| | | | | 382/103 |
| 2003/0002712 | A1 * | 1/2003 | Steenburgh | G06T 7/285 |
| | | | | 382/103 |
| 2011/0176000 | A1 * | 7/2011 | Budge | G06T 7/246 |
| | | | | 348/E7.054 |
| 2014/0161316 | A1 | 6/2014 | Golan et al. | |
| 2016/0231411 | A1 * | 8/2016 | Kumar | G01S 3/7864 |
| 2017/0091561 | A1 * | 3/2017 | Pham | G06V 40/20 |
| 2017/0169297 | A1 | 6/2017 | Bernal et al. | |
| 2018/0374233 | A1 * | 12/2018 | Zhou | G06F 18/22 |
| 2019/0147676 | A1 | 5/2019 | Madzhunkov et al. | |
| 2020/0349348 | A1 * | 11/2020 | Zhou | G06N 3/0464 |
| 2021/0073563 | A1 * | 3/2021 | Karianakis | G06V 40/103 |
| 2021/0225013 | A1 * | 7/2021 | Kim | G06V 40/10 |
| 2023/0088414 | A1 * | 3/2023 | Toni | G06N 20/00 |
| | | | | 382/103 |
| 2024/0046707 | A1 * | 2/2024 | Kudo | G06V 40/40 |

FOREIGN PATENT DOCUMENTS

| | | |
|---|---|---|
| JP | H11175782 A | 7/1999 |
| WO | 2015/045233 A1 | 4/2015 |

OTHER PUBLICATIONS

Aske R. Lejbolle et al., One-to-One Person Re-Identification for Queue Time Estimation, [online], 2020, https://ieeexplore.ieee.org/document/9191293.

Abderrahman Ait Ali et al: "Dynamic Origin-Destination Estimation Using Smart Card Data: An Entropy Maximisation Approach"—The Swedish National Road and Transport Research Institute (VTI) P.O. Box 55685, 114 28 Stockholm, Sweden.

Mnay Kumar V et al: "Appearance-Invariant Entry-Exit Matching Using Visual Soft Biometric Traits"—Electronics Letters Jul. 7, 2019 vol. 00 No. 00.

Vinay Kumar et al: "Monitoring of People Entering and Exiting Private Areas Using Computer Vision"—Department of studies in Computer Science, University of Mysore, Mysuru, India—IET Journals, The Institution of Engineering and Technology, 2019.

Mang Ye et al., "Deep Learning for Person Re-identification: A Survey and Outlook", arXiv:2001.04193 [cs.CV] (Jan. 13, 2020), https://arxiv.org/abs/2001.04193.

Mohib Ullah et al: "Combinatorial Optimization for Multi-Target Tracking", Jun. 15, 2020.

Yutaka Shimada et al: Person Re-identification for Estimating Bus Passenger Flow, 2019.

Fengjiao Fan et al: "Visual Object Tracking Based on Perceptual Hash Algorithm", 2015 12th international computer conference on wavelet active media technology and information processing (ICCWAMTIP), Dec. 18, 2015, pp. 233,236.

* cited by examiner

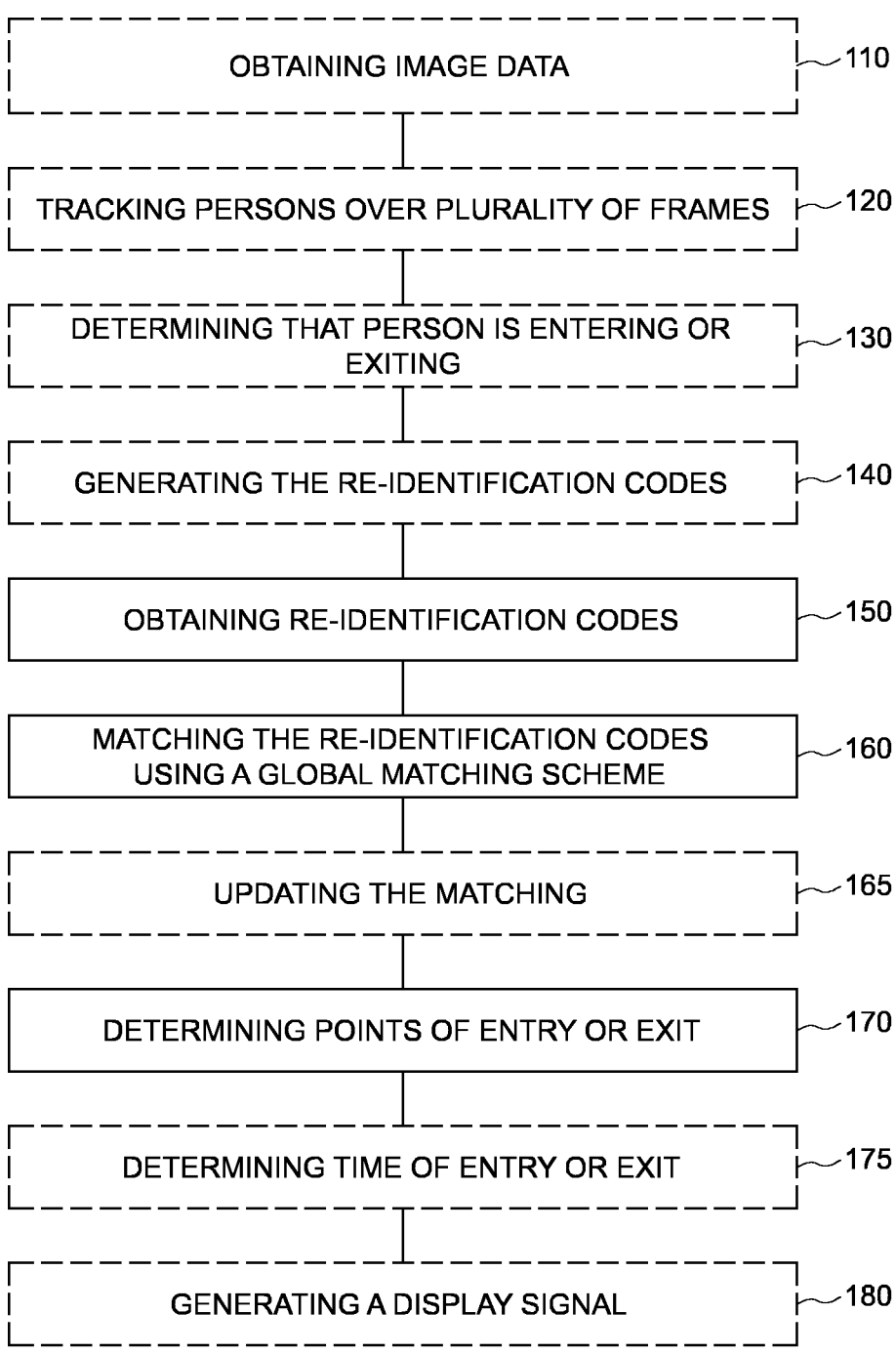

OBTAINING IMAGE DATA — 110

TRACKING PERSONS OVER PLURALITY OF FRAMES — 120

DETERMINING THAT PERSON IS ENTERING OR EXITING — 130

GENERATING THE RE-IDENTIFICATION CODES — 140

OBTAINING RE-IDENTIFICATION CODES — 150

MATCHING THE RE-IDENTIFICATION CODES USING A GLOBAL MATCHING SCHEME — 160

UPDATING THE MATCHING — 165

DETERMINING POINTS OF ENTRY OR EXIT — 170

DETERMINING TIME OF ENTRY OR EXIT — 175

GENERATING A DISPLAY SIGNAL — 180

310          Image Sequence

320          Images with
             identified faces

330          Track people
             across frames

340

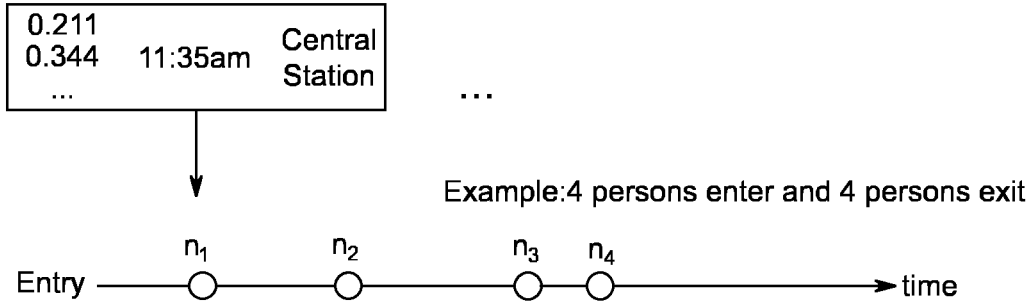
| 0.211<br>0.344<br>... | 11:35am | Central<br>Station |
|---|---|---|
...
Example:4 persons enter and 4 persons exit
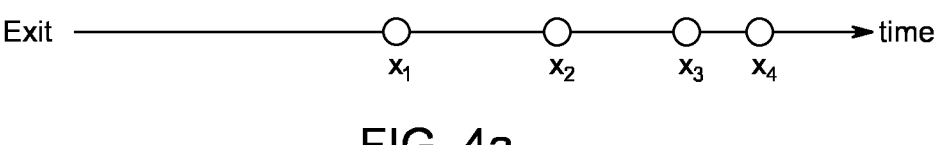
FIG. 4a
Cost Matrix
|  | $n_1$ | $n_2$ | $n_3$ | $n_4$ |
|---|---|---|---|---|
| $x_1$ | 0.2 | 0.1 | * | * |
| $x_2$ | 0.15 | 0.1 | 0.2 | * |
| $x_3$ | 0.01 | 0.5 | 0.6 | 0.4 |
| $x_4$ | 0.4 | 0.3 | 0.7 | 0.05 |
Cost Of assigning $x_3$ to $n_4$.
Lower means better match.
Computed by comparing re-id
codes and weighing in statistical
priors based on time and location
\* Forbidden due to exit
before entry
Linear Assignment Problem Solver
$x_1$---$n_2$
$x_2$---$n_3$
$x_3$---$n_1$
$x_4$---$n_4$
FIG. 4b

CONCEPT FOR AN ENTRY-EXIT MATCHING SYSTEM

FIELD

Examples relate to a concept for an entry-exit matching system, and in particular to an evaluation device, a method and a computer program for person re-identification for entry-exit matching in a transportation system.

BACKGROUND

The analysis of transportation patterns is of interest in the automated resource planning in transportation systems. In the field of transportation analysis, travel demand is often summarized in an Origin-Destination matrix containing quantitative estimates of traffic flows between locations in the transport network. This is a well-studied and widely-applied area of research. Actual measurements of passenger travel routes through each mode of transportation are valuable inputs to the Origin-Destination analysis. In many cases, such measurements are performed by having personnel on site/on board gathering the information by manually surveying, counting or identifying passengers entering or exiting busses, trains, trams etc. However, manual methods of gathering Origin-Destination data within transport networks are usually costly, and sample sizes are often small and prone to error and bias.

Automated Fare Collection (AFC), which is often implemented using "smart cards", can in some cases provide a reliable source of information about passenger origin and destination, but in some cases not all details about fares are gathered. AFC systems can be divided into two types, open and closed. Closed AFC systems have passengers registering both at entry and exit locations. In open AFC systems passengers only register at entry. In networks with open AFC systems, there is no information about exiting passengers, so entry-exit matching cannot be performed. In absence of AFC or places with open AFC, other Automated Data Collection Systems (ADCS) can provide the transport agencies with valuable insight into customer travel patterns. This can benefit both agencies and passengers.

In academic literature, a detection of a person entering or exiting a space is discussed, in order to create so-called "entry events" or "exit events". In some literature, such detection is done using visual soft biometric traits, which can serve as a way of narrowing a gallery of people with whom an exiting person could match. However, in such literature, an overall matching strategy is not discussed. Such systems are usually very limited in their ability to assess the confidence of proposed matchings. Therefore, they have drawbacks with regards to 'noisy' and occasionally missing input data.

There may be a desire for an improved concept for entry-exit matching.

SUMMARY

This desire is addressed by the subject-matter of the independent claims.

Various aspects of the present disclosure relate to a concept for determining points of entry and exit of passengers in a transportation system. The proposed concept combines different techniques in order to provide an improved concept for entry-exit matching that is suitable for dealing with noise, such as suboptimal camera image data being collected by the system.

In particular, the proposed concept is based on visual person re-identification. Visual person re-identification systems serve the purpose of distinguishing or re-identifying people, from their appearance alone, in contrast to identification systems that seek to establish the absolute identity of a person (usually from facial features). For example, the use of re-identification in a system may stem from the lack of a priori knowledge of the actual identity of all persons involved, but the use of re-identification may also be due to externally enforced privacy policies.

When visual person re-identification is performed, image data of the respective persons is analyzed using a (typically machine-learning-based) re-identification system, which generates a code, denoted re-identification code, that represents that person. In general, the re-identification code is often generated based on facial features of the person. However, additional features of the person may also be taken into account, such as their clothing, or their height, stature or gait. In the proposed concept, the re-identification system is a system that is suitable for extracting features of the person from camera images, such that these features can be used to re-identify people by comparing them with features extracted from other camera images.

In the proposed concept, these re-identification codes are generated when a person is detected to be entering or exiting the transportation system, e.g. on camera. This may be done in an unobtrusive manner such that no action is required for people entering/exiting the transportation system. Upon detection of such an entry event or exit event, a re-identification code is generated and stored, together with the point of entry or exit (e.g., a timestamp and/or a location of entry/exit). Based on the stored data, a global matching is performed, which attempts to find an optimal assignment/matching between the re-identification codes of persons entering and the re-identification codes of persons exiting the transportation system. For example, an assignment/matching system may be used for finding an optimal or close-to-optimal assignment/matching from exiting people to entering people.

As is evident, the proposed concept may comprise or consist of three subsystems—a system for unobtrusively detecting people entering and exiting a door using a camera, a re-identification system, and an assignment/matching system. With respect to public transportation, the proposed concept provides an automated entry-exit matching system that allows transport agents without a closed AFC system to gain insight into passenger fare details such as start and end point of busses, trains, metros etc. The information can be made available with only a short delay. In general, the system does not require the passengers to follow any instructions. In particular, the passengers may not need to actively interact with the system. Of the three systems outline above, at least the assignment/matching system may be implemented by an evaluation device, method and/or computer program. The proposed concept, e.g., the evaluation device, method and/or computer program, may be implemented separately in each vehicle, or centrally at a central point of a transportation system.

Various examples of the present disclosure relate to an evaluation device for person re-identification in a transportation system. The evaluation device comprises processing circuitry that is configured to obtain a plurality of re-identification codes. Each re-identification code represents a person being recorded by at least one camera when entering or exiting at least a section of the transportation system. The processing circuitry is configured to match the plurality of re-identification codes using a global matching scheme to obtain a plurality of matched pairs of re-identification codes, such that each matched pair of re-identification codes comprises a re-identification code of a person entering and a re-identification code of a person exiting. The global matching scheme is based on reducing an overall distance between the re-identification codes of the matched pairs of re-identification codes over the plurality of matched pairs of re-identification codes. The processing circuitry is configured to determine points of entry and exit for the plurality of matched pairs of re-identification codes. Due to the use of re-identification, no external database might be required, and no images of the cameras need to be stored. By using a global matching scheme, the proposed system can re-assign previously matched entries and exits based on new observations if it makes the overall matching more probable, and it may evaluate its confidence of a match based on overall consistency with other matches instead of assessing the quality of the match in isolation. In some examples, the proposed system may provide probable matchings even if entry- and/or exit measurements are missing.

The above-described matching problem may generally be tackled using different types of algorithms. In particular, combinatorial optimization algorithms may be used, as they are well-suited for optimization problems having a finite set of discrete potential solutions. Accordingly, the global matching scheme may be based on a combinatorial optimization algorithm. Combinatorial optimization algorithms are in particular suitable for Linear Assignment Problems (LAPs), which is the general concept underlying the matching between the re-identification codes of persons entering and exiting.

In general, the above matching problem can be formulated as a bi-partite graph, with vertices representing re-identification code of persons entering being contained in one part of the graph and vertices representing re-identification codes of persons exiting being contained in the other part of the graph. Thus, the global matching scheme may be based on a graph-based algorithm. For example, the global matching scheme may be used to identify a set of graph edges that reduce or minimize the overall distance of edges between the two sets of vertices in the graph.

One such combinatorial, graph-based algorithm is the so-called Hungarian algorithm. Accordingly, the global matching scheme may be based on the Hungarian algorithm. The Hungarian algorithm is a combinatorial optimization algorithm that solves assignment problems. Alternatively, other (combinatorial) optimization algorithms may be used.

In the comparison of re-identification codes, a similarity measure is used to define a "distance" between two re-identification codes. Linear Assignment Problems, on the other hand, generally use a (usually non-monetary) cost as optimization target. Therefore, each pair of two re-identification codes may be associated with a cost value that is based on the distance between the re-identification codes of the pair. The global matching scheme may be based on reducing the overall sum of the cost values of the plurality of matched pairs of re-identification codes. In other words, the cost may model the distance between the re-identification codes.

In various examples, the global matching scheme is further based on prior statistical knowledge on the points of entry and exit. Prior statistical knowledge can be used to infer a match in case one of the re-identification codes of the respective person could not be properly generated. In general, the prior statistical knowledge may be based on observations from the past, e.g. observation on how many people get on or off at certain points of entry or exit, or how busy a point or entry or exit, such as a station, usually is (at this time). For example, the prior statistical knowledge may comprise statistics on an overall average/mean number of stations being traveled, a most likely exit station for a given entry station (or vice versa), an expected proportion or absolute value of passengers entering or exiting at a given station (at a given time). In some examples, the proposed system can improve over time by feeding observed statistics back to the matching algorithm.

In general, each re-identification code may be based on facial features of the respective person. Person re-identification using facial features can enable re-identification even if the respective person changes their clothing, e.g., by putting on a hat or by taking off a jacket. Additionally or alternatively, each re-identification code may be based on one or more of a gait of the person, an estimated age of the person, an estimated gender of the person, an estimated height of the person, an estimated length of body parts, and a clothing of the person. These features may be particularly useful in scenarios where the facial features of the person could not be properly transformed into a (portion of) a re-identification code.

In some examples, each re-identification code is associated with a timestamp and/or location information. The processing circuitry may be configured to determine the time and/or location of entry and exit for the plurality of matched pairs of re-identification codes. This may be useful for determining statistical information, such as the Origin-Destination matrix, modeling patterns within the transportation system.

A global matching scheme may provide the most accurate results when it is based on the entire set of data. However, this accuracy can only be reached after the data collection is finished. In some examples, however, it may be desirable to gather initial or intermittent results before the data collection is finished. Therefore, an initial matching may be performed, and updated over time. For example, the processing circuitry may be configured to update the matching of the plurality of re-identification codes based on the global matching scheme when a re-identification code is added to the plurality of re-identification codes. In other words, the global matching may be repeated after a re-identification code is added to the plurality of re-identification codes. Consequently, the global matching scheme is initially applied on incomplete data, which may provide fast initial results, and later refined as additional re-identification codes are added to the plurality of re-identification codes.

As outlined above, there may be cases where the persons cannot be properly recorded by the at least one camera, such that the respective re-identification codes are potentially unsuitable for a straight-forward matching procedure. To mitigate, different measures may be taken. For example, an explicit confidence of zero may be used for all matchings with the respective re-identification codes. In other words, as will be elaborated with respect to the generation of the re-identification codes, when a re-identification code is generated from image data that is unsuitable for generating a re-identification code that properly represents the respective person, this re-identification code can be marked as unsuitable, e.g., by assigning the individual re-identification code a low confidence level. When such re-identification codes are matched with other re-identification codes, due to the unsuitability of the image data, the distance between these re-identification codes may have less meaning than a distance between re-identification codes being generated from suitable image data. Therefore, a confidence of a match involving at least one re-identification code that is generated from unsuitable image data may be set to be lower (e.g., to zero) than a confidence of a match involving two re-identification codes being generated from suitable image data, as the algorithm has less confidence that this matching, based on the distance between the re-identification codes alone, is correct. In other words, the confidence or confidence level of a re-identification code may indicate the quality or suitability of the re-identification code for comparison with other re-identification codes. The confidence or confidence level of a matching between re-identification code may indicate the quality of the match (e.g., as determined based on the distance between the re-identification codes alone).

Alternatively, an all-zero vector may be used as a re-identification code, which has the property of having an expected distance of zero to all persons, or the distance of the re-identification code may be explicitly set to be equal to other re-identification codes. For example, the plurality of re-identification codes may comprise a subset of symbolic re-identification codes having equal distance to re-identification codes outside the subset or having an expected distance of zero to (all) other re-identification codes. The symbolic re-identification codes may be based on image data showing a person entering or exiting the transportation system, with the image data being unsuitable for generating a re-identification code that is representative of the person. For example, a symbolic re-identification code may have a pre-defined value (e.g., correspond to a pre-defined binary vector), such as the all-zero vector, an all-ones vector, or another type of reserved re-identification code that cannot be obtained based on image data (e.g., as the values output by a machine-learning model being used for generating the re-identification code are restricted to a value range outside the reserved/symbolic re-identification codes. In other words, a symbolic re-identification code may be a re-identification code that is not obtainable by generating the re-identification code based on image data. In other words, the symbolic re-identification code may be reserved, and thus not be generated, when the image data is processed by the machine-learning model being used for generating the re-identification codes. For example, a symbolic re-identification code may be easily identified, e.g., as it has a reserved value, such as the all-zero vector.

In various scenarios, a tracking of persons using machine-learning may be undesirable or even prohibited. In the proposed concept, the tracking of persons across time and/or location may be made impossible (or at least significantly harder) by using so-called transformed re-identification codes, which are re-dentification codes that are transformed (encrypted) in a way that enables a comparison of re-identification codes taken at the same time and/or location, but is useless across time and location. Accordingly, in some examples, the plurality of re-identification codes is a plurality of transformed re-identification codes. Each transformed re-identification code may be based on a similarity-preserving transformation of a re-identification code that represents a person. The re-identification codes may be transformed based on a transformation parameter that is dependent on at least one of a time and a location. For example, the transformed re-identification codes may be infeasible to convert to the underlying re-identification codes without knowledge of the underlying transformation parameter.

In some examples, the re-identification codes may be generated by an external entity, e.g., by a computing device that is co-located with the at least one camera. In this case, the plurality of re-identification codes (or even the plurality of transformed re-identification codes) may be obtained by receiving the (transformed) re-identification codes from the device that is co-located with the at least one camera. In some examples, however, the evaluation device may also generate the plurality of re-identification codes. The processing circuitry may be configured to obtain image data of the at least one camera. The processing circuitry may be configured to generate the plurality of (transformed) re-identification codes based on the image data. In other words, the (transformed) re-identification codes may be obtained by generating the re-identification codes based on the image data.

In transportation systems, persons are often recorded by cameras while they remain within the respective vehicles. The focus of the proposed concept is, however, on persons entering or exiting the transportation system. Therefore, the image data may be analyzed to determine whether the person being recorded is entering or exiting the vehicle. The processing circuitry may be configured to track persons over a plurality of frames of image data. The processing circuitry may be configured to determine that a person is entering or exiting the transportation system based on the tracking of the person over the plurality of frames of image data. The processing circuitry may be configured to generate a re-identification code of the person upon determination of the person entering or exiting the transportation system. Thus, only re-identification codes of persons entering or exiting the transportation system might be added to the plurality of re-identification codes.

The tracking of the persons over multiple frames may also be used to improve the quality, i.e., the "representability" of the generated re-identification codes. For example, not all image frames may be equally suitable for generating a re-identification code that properly represents the person. For example, due to shading, occlusion, or the face being turned away from the camera during entering or exiting the transportation vehicle, the distance between re-identification codes representing the same person may be larger than under ideal circumstances. Therefore, one (or a subset of) the frames may be selected that is suitable or the generation of a re-identification code, and the re-identification code that is generated based on this frame may be used. In other words, the processing circuitry may be configured to track persons over a plurality of frames of image data, and to generate the re-identification code of the person based on one of the frames of image data based on a suitability of the respective frame for the generation of a re-identification code.

The suitability of the respective frame may be determined programmatically. For example, the processing circuitry may be configured to determine the suitability of the frames using a clustering algorithm. For example, a re-identification code may be determined for each of the frames. The re-identification codes may be clustered, and a re-identification code may be selected from the biggest cluster. Alternatively or additionally, the processing circuitry may be configured to determine the suitability of the frames based on an angle of a face of the person relative to the at least one camera. For example, some angles may be more suitable for generating a re-identification code than others.

As outlined above, in some cases, image frames may be unsuitable for generating a re-identification code that is representative of the person. To deal with such situations, various techniques were outlined above. These techniques may be applied during the generation of the respective re-identification codes. For example, the processing circuitry may be configured to generate a symbolic re-identification code having equal distance to other re-identification codes or having an expected distance of zero to (all) other re-identification codes if the frames of image data are unsuitable for generating a re-identification code that is representative of the person.

The gathered data may be used to visualize the flow of passengers, e.g., to support decisions regarding the number of carriages required etc., or to show a conductor of a vehicle the number and/or location of passengers within the vehicle. The processing circuitry may be configured to generate a display signal comprising a visual representation of the matched pairs of re-identification codes. For example, the visual representation may comprise a first timeline representing the points of entry, a second timeline representing the points of exit, and visual elements for linking the points of entry to the points of exit. Such a representation may high-light transportation patterns that are contained in the gathered data.

For a more intuitive analysis, different colors may be used to represent the different persons. For example, the points of entry and points of exit may be represented as points on the respective timelines. Each point may have a color that is derived from the re-identification code associated with the respective point. Additionally or alternatively, points representing matched re-identification codes may be connected by a line.

As alluded to above, the proposed concept may be applied at different scale. For example, the proposed concept may be applied to single vehicles. In other words, the transportation system may be a single vehicle, with each re-identification code representing a person being recorded by a camera when entering or exiting the vehicle. For example, the vehicle may be one of a bus, a train, an airplane, and a ferry. Moreover, the matching may be limited to a single transit by a single vehicle. Accordingly, the plurality of re-identification codes may represent persons entering and exiting the vehicle during a single transit between two terminal stations, the transit comprising a plurality of intermediate stops. This may enable a decentralized analysis of transportation patterns.

Alternatively, the proposed concept may be used on a larger, more interconnected scheme. For example, the transport system may be a system of transportation stations with a common access control mechanism.

Various aspects of the present disclosure relate to a corresponding method for person re-identification in a transportation system. The method comprises obtaining a plurality of re-identification codes. Each re-identification code represents a person being recorded by at least one camera when entering or exiting at least a section of the transportation system. The method comprises matching the plurality of re-identification codes using a global matching scheme to obtain a plurality of matched pairs of re-identification codes, such that each matched pair of re-identification code comprises a re-identification code of a person entering and a re-identification code of a person exiting. The global matching scheme is based on reducing an overall distance between the re-identification codes of the matched pairs of re-identification codes over the plurality of matched pairs of re-identification codes. The method comprises determining points of entry and exit for the plurality of matched pairs of re-identification codes.

Various aspects of the present disclosure relate to a corresponding computer program having a program code for performing the above method, when the computer program is executed on a computer, a processor, processing circuitry, or a programmable hardware component.

BRIEF DESCRIPTION OF THE FIGURES

Some examples of apparatuses and/or methods will be described in the following by way of example only, and with reference to the accompanying figures, in which

FIG. 1b shows a flow chart of an example of a method for person re-identification in a transportation system;

FIG. 4a shows a timeline of an example of persons entering and exiting a transportation system;

FIG. 4b shows a cost matrix of an example of persons entering and exiting a transportation system;

DETAILED DESCRIPTION

Figure 1A:
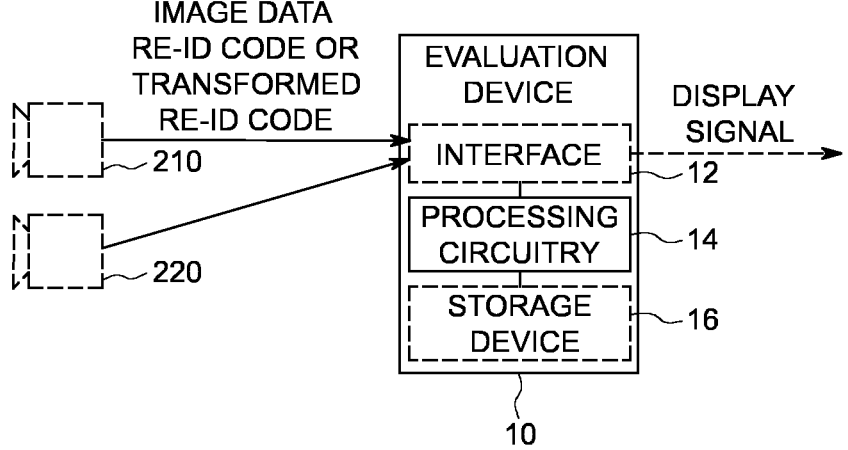
FIG. 1a shows a block diagram of an example of an evaluation device for person re-identification in a transportation system and of a system comprising the evaluation device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1a shows a block diagram of an example of an evaluation device 10 for person re-identification in a transportation system, and of a system comprising the evaluation device 10 and at least one camera 210; 220. The evaluation device 10 comprises processing circuitry 14 that is configured to provide the functionality of the evaluation device 10. Optionally, the evaluation device 10 may comprise one or more further components, such as at least one interface 12 for exchanging information, and/or at least one storage device 16 for storing and retrieving information. For example, the optional interface 12 and/or the optional storage device 16 may be coupled with the processing circuitry 14. For example, the interface 12 may be used to receive and/or transmit information, such as image data, re-identification codes and/or a display signal. The storage device 16 may be used for storing and retrieving information, such as the re-identification codes, matchings between re-identification codes, and/or a machine-learning model being used for generating the re-identification codes.

The processing circuitry is configured to obtain a plurality of re-identification codes. Each re-identification code represents a person being recorded by at least one camera when entering or exiting at least a section of the transportation system. The processing circuitry is configured to match the plurality of re-identification codes using a global matching scheme to obtain a plurality of matched pairs of re-identification codes, such that each matched pair of re-identification codes comprises a re-identification code of a person entering and a re-identification code of a person exiting. The global matching scheme is based on reducing an overall distance between the re-identification codes of the matched pairs of re-identification codes over the plurality of matched pairs of re-identification codes. The processing circuitry is configured to determine points of entry and exit for the plurality of matched pairs of re-identification codes.

FIG. 1b shows a flow chart of an example of a corresponding method for person re-identification in a transportation system. The method comprises obtaining 150 the plurality of re-identification codes. The method comprises matching 160 the plurality of re-identification codes using the global matching scheme to obtain the plurality of matched pairs of re-identification codes, such that each matched pair of re-identification code comprises a re-identification code of a person entering and a re-identification code of a person exiting. The method comprises determining 170 the points of entry and exit for the plurality of matched pairs of re-identification codes. For example, the method may be performed by the evaluation device. Features introduced in connection with the evaluation device may likewise be introduced in the corresponding method (and vice versa).

Various examples of the proposed concept relate to an evaluation device, method and computer program for person re-identification in a transportation system. In particular, the proposed concept relates to the determination of points of entry and exit of persons in the transportation system, which may be used for generating an Origin-Destination matrix. Contrary to other approaches for generating such a matrix, the proposed concept is based on the automated detection of entry events and corresponding exit events, based on person re-identification and a global matching scheme. The proposed system is designed to be unobtrusive, and might not require interaction from the persons being processed.

The proposed concept is tailored to a use in transportation systems. In this context, the term "transportation system" has many potential levels. For example, the transportation system may correspond to a single vehicle, such as one of a bus, a train (including metropolitan trains), an airplane, and a ferry. In this case, each re-identification code may represent a person being recorded by a camera when entering or exiting the vehicle. In particular, the proposed concept may be applied on single transits of a single vehicle between two terminal stations, in order to gather statistical information on the routes being taken by the passengers. Consequently, the plurality of re-identification codes may represent persons entering and exiting the vehicle during a single transit between two terminal stations, with the transit comprising a plurality of intermediate stops. In other words, the plurality of re-identification codes may be gathered of persons entering and exiting the vehicle during the single transit.

Alternatively, the transportation system may relate to a larger entity encompassing multiple transportation stations, with cameras that are placed at the entries and exits of the multiple stations. In other words, the transport system may be a system of transportation stations with a common access control mechanism (e.g., gates). For example, the transport system may be a metropolitan train system with gates that require passengers to furnish a ticket when entering the transportation system (e.g., by swiping a card), but which might not require furnishing the ticket again when exiting the transportation system. In this case, cameras being placed at the entries and exits may be used to determine the points of entry/exit for the passengers.

As outlined above, the system can be installed in a delimited or confined space, e.g., a vehicle, or a room, or a system of interconnected transportation stations, where people enter and exit through one or more entries and exits. In general, an entry point can also serve as an exit point, e.g., if people enter and exit through the same door, as is often the case in public transportation vehicles. The proposed system might not be suitable for open spaces where the flux of people cannot be conveniently monitored.

Figure 2:
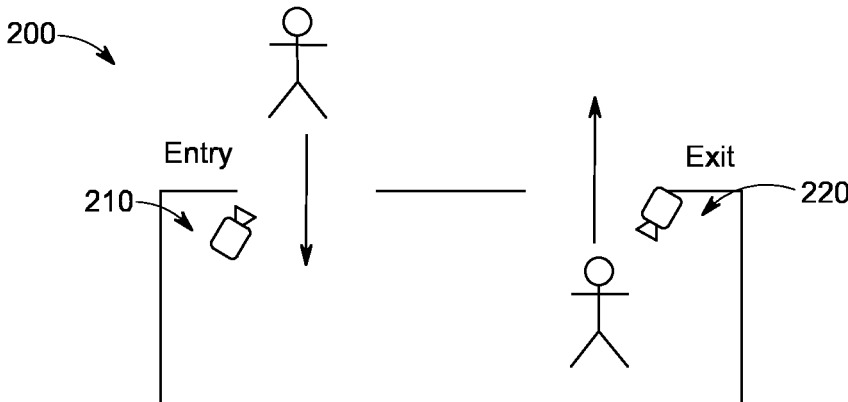
FIG. 2 shows a schematic diagram of a delimited space with a single entry point and a single exit point.

In the following, the transportation system is assumed to be, without loss of generality, a single vehicle, such as a bus, where one door serves as entrance and another as exit. This scenario is illustrated in FIG. 2. FIG. 2 shows a schematic diagram of a delimited space, such as a compartment, with a single entry point and a single exit point. FIG. 2 shows two cameras 210; 220 facing entering and exiting passengers such that images suitable for machine learning based re-identification can be acquired.

As becomes evident from the drawing of FIG. 2, the proposed system relies on the use of at least one camera 210; 220 that is arranged at an entry and/or exit of the transportation system, facing the people entering and exiting, respectively. However, these cameras are external to the evaluation device 10, and are merely connectable to the evaluation device 10. For example, the at least one camera may be arranged in the respective vehicle, or outside the vehicle at the transportation station. In some examples, at least one camera is connected to a computation device that is capable of generating the (machine-learning-based) re-identification code. For example, the re-identification codes may be generated by a computing device that is co-located with the at least one camera. In this case, the evaluation device might merely receive the re-identification codes of persons entering or exiting the transportation system from the camera. Alternatively, the re-identification codes may be generated by the evaluation device. Similarly, the detection of a person entering or exiting the vehicle may be performed by the evaluation device. In this case, the evaluation device may obtain image data from the at least one camera. Optionally the system can connect to additional sensors assisting in the task of detecting when people enter and exit, such as a laser-based sensor. However, in most cases the cameras can be used in combination with a computation device, such as the computation device co-located with the at least one camera or the evaluation device, can handle this task without assistance. In some examples, additional cameras per entry/exit may be used to assist in entry/exit detection and re-identification measurements.

Once the persons are recorded by the at least one camera, the respective image data generated by the at least one camera is processed via software, e.g., by the computing device being colocated with the at least one camera, or by the evaluation device, to generate the re-identification codes and to detect the entering or exiting of persons. In particular, the proposed system may use Machine Learning (ML)-based techniques for person re-identification and entry detection. These techniques are used in combination with algorithms used to find globally optimal assignments between persons entering and existing the transportation system, e.g., when provided with a cost metric. Therefore, the proposed system comprises three software components, of which at least the matching component is performed by the evaluation device. For example, software may be used to implement a subsystem for detecting people entering and exiting a door in a camera feed (to be performed by the computing device being co-located with the at least one camera, or by the evaluation device), a machine learning based re-identification system (to be performed by the computing device being co-located with the at least one camera, or by the evaluation device), and a global matching algorithm, such as a combinatorial optimization algorithm (to be performed by the evaluation device).

Figures 1, 2, 3:
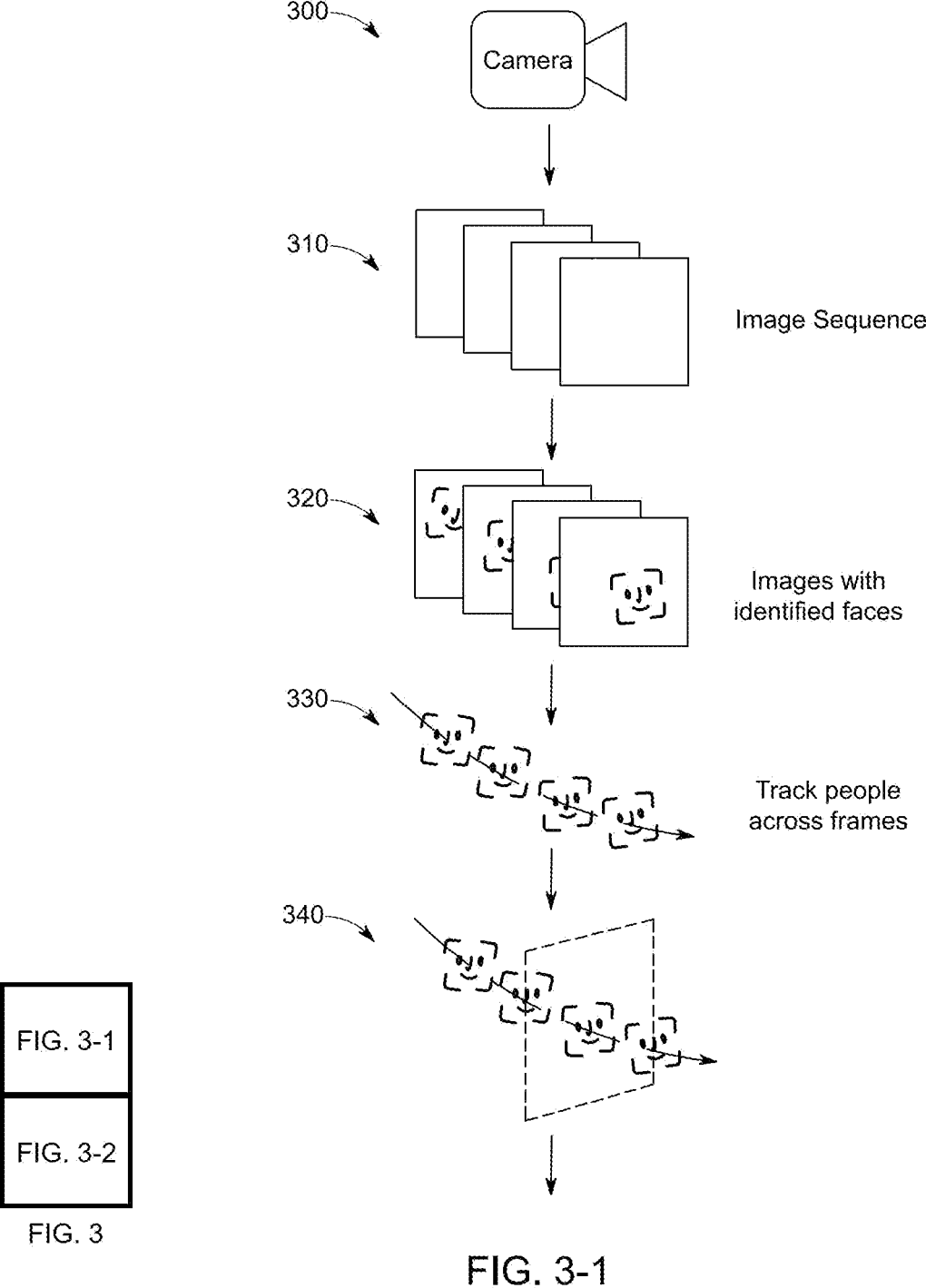
FIG. 3, broken into partial views 3-1 and 3-2, shows a flow chart of an example of a process for registering a passenger entering or exiting a transportation system.
Figures 1, 2, 3:
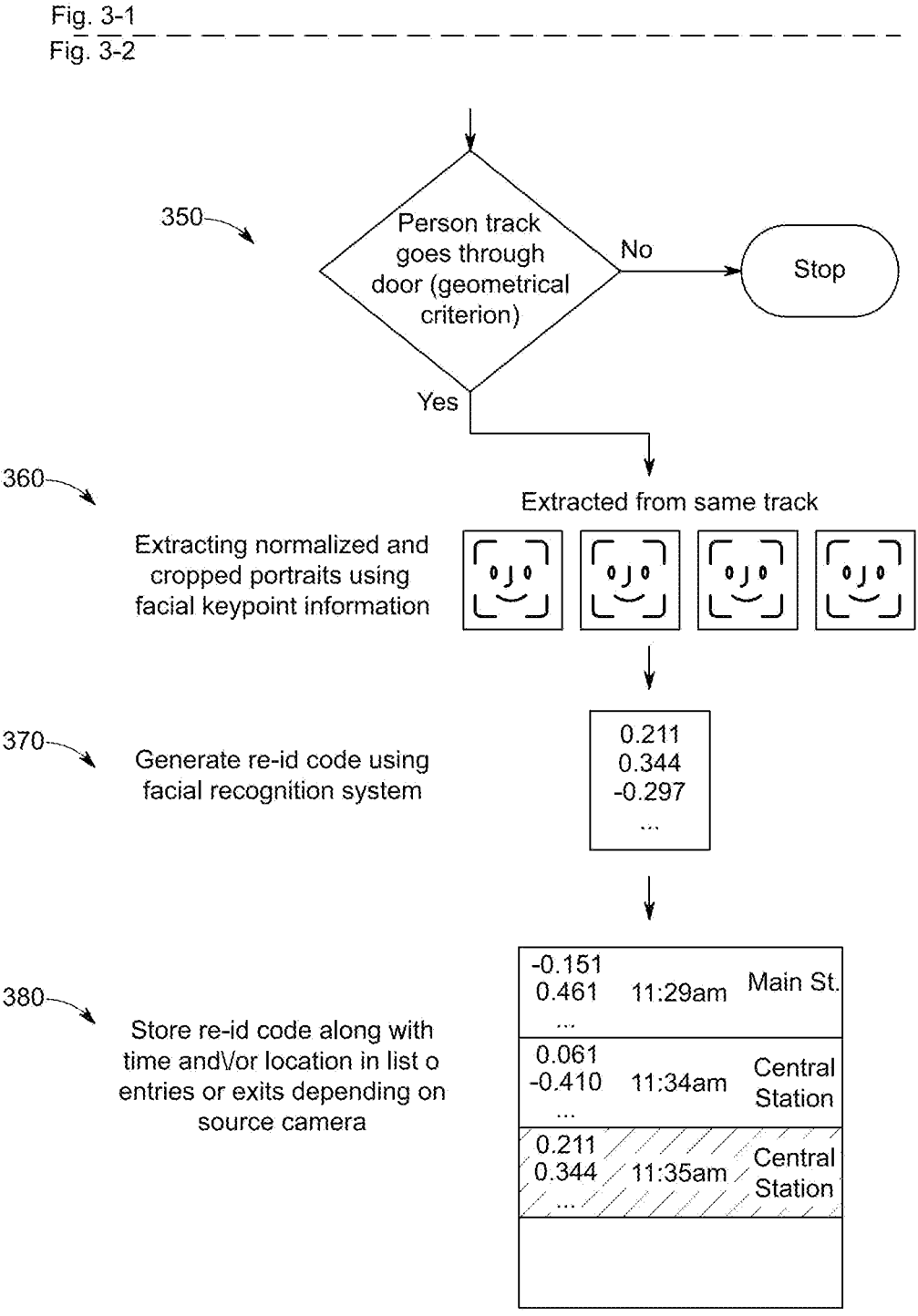

In FIG. 3, a flow chart of an example of a process for registering a passenger entering or exiting is shown. As outlined in FIG. 3, the process comprises a number of components. In the example process of FIG. 3, a camera 300 is used to generate an image sequence 310. The images may depict faces of persons, which may be identified 320 within the images. The persons/people may be tracked 330 across frames. For example, the persons may be tracked in the vicinity of a door 340. A determination 350 may be made on whether a tracked person goes through the door (e.g., based on a geometrical criterion). If not, the algorithm may stop, and start from the beginning. If yes, normalized and cropped portraits may be extracted 360 using facial key-point information. Based on the normalized and cropped portraits, a re-identification code may be generated using a facial recognition system. The re-identification codes may be stored along with a time/location the respective image data was taken in a list of entries or exits, e.g., depending on the camera being the source of the respective image data. The stored data may be used to compare entry events with exit events at a later point. FIG. 3 should be seen as an example of a process for registering a passenger entering or exiting the vehicle. Some components of the proposed concept may be omitted or replaced, as outlined the following sections of the present disclosure.

In some examples, the re-identification codes are generated by the evaluation device and that the entry/exit detection is also performed by the evaluation device. In this case, the re-identification codes may be obtained by generating the re-identification codes, by the evaluation device, based on image data being supplied by the at least one camera. Alternatively, these tasks may be performed by the computing device being co-located with the at least one camera. In this case, the re-identification codes may be obtained by receiving the re-identification codes from the computation device being co-located with the at least one camera. In the following, it is assumed that the re-identification codes are generated by the evaluation device and that the entry/exit detection is also performed by the evaluation device.

The circuitry is configured to obtain the plurality of re-identification codes, e.g., by receiving them from the computing device co-located with the at least one camera, or by generating them. In both cases, a machine learning based re-identification system that is suitable for encoding camera image data of a person into re-identification codes may be used. The tracking of persons (or objects) can be done by generating so-called re-identification codes from the images that represent the person that is perceptible within the images. In re-identification systems, for a given person, the re-identification codes are generated to be similar across multiple images being taken of a person, enabling an evaluation device to track the entry and exit of the respective persons. For example, the re-identification codes may have the property that they provide a quantitative distance metric such that re-identification codes representing the same person typically are closer than re-identification codes encoded from images of different people.

In general, re-identification may be implemented by applying a hash function to each image in order to produce the re-identification code. The generated hash codes represent the persons that are visible within the respective images, and may be compared using a similarity metric. Various methods can be used to implement such a system for visual re-identification. A number of systems use hand-crafted visual features (like gender, age, facial features, color of clothing, hair style, body type etc.), but in order to gain the highest accuracy possible, many approaches rely on deep learning-based techniques based on, e.g., triplet loss. The exact method used for computing the re-identification code, however, is not important for the sake of explaining the concept. For example, Ye et al: "Deep Learning for Person Re-identification: A Survey and Outlook" (2020) provides examples for hashing algorithms for re-identification that are based on deep learning. Accordingly, a machine-learning model, e.g. a deep learning network, may be used to generate the re-identification code.

In various examples, a machine-learning based facial re-identification system may be used. In other words, each re-identification code may be based on facial features of the respective person. The proposed system may use a machine-learning based facial key-point detection system, with the key-points being encoded as re-identification codes, which can increase the accuracy of the facial recognition system. In some examples, the re-identification system can use a combination of systems operating together. Besides facial re-identification, age/gender classification, height and gait estimation, clothing etc. may be considered when generating the re-identification codes. In other words, each re-identification code may be further based on one or more of a gait of the person, an estimated age of the person, an estimated gender of the person, an estimated height of the person, an estimated length of body parts, and a clothing of the person.

In the proposed concept, the persons are being recorded while they enter or exit the vehicle, which typically occurs at transportation stations (e.g., bus stops). At transportation stations, however, in general, many persons enter or exit the vehicle, often in a hurry. Accordingly, the image data generated by the at least one camera may be blurry, may represent the persons from a sub-optimal angle, or the persons may be partially occluded by other persons standing in the entry/exit area. Therefore, multiple image frames may be considered when generating the respective re-identification codes. For example, having tracked the person over multiple frames may increase the probability of getting a reliable re-identification-code. In the following, the generation of the re-identification codes, and the tracking of persons with respect to the evaluation device. However, the same techniques may alternatively be applied within the computation device being co-located with the at least one camera.

For example, the processing circuitry may be configured to obtain image data of the at least one camera, and to generate the plurality of re-identification codes based on the image data. Accordingly, the method may comprise obtaining 110 the image data, and generating 140 the plurality of re-identification codes. For example, the re-identification codes may, in general, be generated using the techniques outlined above. Additionally, the processing circuitry may be configured to track persons over a plurality of frames of image data, and the method may comprise tracking 120 persons over the plurality of frames of image data. This tracking may be used for the following purposes—for generating a re-identification code that is highly representative of the person, and for determining a person entering or exiting the transportation system.

Regarding the former feature, the processing circuitry may be configured to generate the re-identification code of the person based on one of the frames of image data (i.e., one of the plurality of frames of image data) based on a suitability of the respective frame for the generation of a re-identification code. This suitability can be determined programmatically. For example, experiments have shown that, in facial recognition, the angle of the face of the person relative to the camera is a major factor regarding the suitability of the respective image frame. The system may be better at re-identifying persons that look towards the camera than persons that look away from the camera. Therefore, the processing circuitry may be configured to estimate an angle of the face of the person relative to the camera, e.g., using facial key-point estimation, and to determine the suitability of the frames based on the angle of the face of the person relative to the at least one camera.

Alternatively or additionally, a clustering-based methodology may be used. For example, the circuitry may be configured to generate multiple re-identification codes from multiple image frames showing the person, and to cluster the generated re-identification codes using a clustering algorithm (e.g., using unsupervised machine-learning). In other words, the processing circuitry may be configured to determine the suitability of the frames using a clustering algorithm. In general, when a large cluster emerges, the re-identification codes included in that cluster are highly representative of that person, as they are similar to re-identification codes generated from other images, which may include images taken from another angle. Therefore, a re-identification code from the largest cluster may be picked as re-identification code representing the person.

The tracking of the person across frames may also be used to determine when a person is entering or exiting the transportation system. This determination may be particularly challenging in crowded buses and trains, where many persons stand near the entry/exit of the vehicle. Therefore, the system, e.g., the computation device being co-located with the at least one camera, or the evaluation device, may comprise a subsystem for detecting persons entering and exiting a door in a camera feed. For example, a machine-learning based facial key-point detection system may be used in combination with a tracking system for detecting persons entering and exiting a door of the vehicle. For example, the processing circuitry may be configured to determine that a person is entering or exiting the transportation system based on the tracking of the person over the plurality of frames of image data. Accordingly, the method may comprise determining 130 that a person is entering or exiting the transportation system based on the tracking of the person over the plurality of frames of image data. For example, the person can be followed from frame to frame while passing through the door. A criterion can be put in place to distinguish people passing through the door from people standing still or walking by without passing through the door, e.g., based on the movement of the person relative to the door. The processing circuitry may be configured to determine the person entering or exiting based on the movement of the person, the movement being tracked across frames. For example, the processing circuitry may be configured to generate a re-identification code of the person upon determination of the person entering or exiting the transportation system. The method may comprise generating a re-identification code of the person upon determination of the person entering or exiting the transportation system. Consequently, each re-identification code may represent a person being recorded by at least one camera when entering or exiting at least a section of the transportation system, In some cases, due to occlusion, shading etc., it may not be possible to generate a re-identification code that is highly representative of the person. In this case, e.g., in the case of missing or unsuitable measurements, the resulting re-identification codes may be assigned equal distance to all other re-identification codes. This may be done either by using special re-identification codes, or by assigning each re-identification code a confidence value that influences the re-identification code's distance to other re-identification codes. For example, the processing circuitry may be configured to generate a symbolic re-identification code having equal distance to other re-identification codes or having an expected distance of zero to (all) other re-identification codes if the frames of image data are unsuitable for generating a re-identification code that is representative of the person. For example, a re-identification code having a reserved value may have equal distance to other re-identification codes may be used as symbolic re-identification code. Alternatively, an all-zero vector may be used as symbolic re-identification code, which may have an expected distance of zero to (all) other re-identification codes. Consequently, the plurality of re-identification codes comprises a subset of symbolic re-identification codes having equal distance to re-identification codes outside the subset or having an expected distance of zero to (all) other re-identification codes. Alternatively or alternatively, the generated re-identification code may be assigned a confidence value that is zero, while other re-identification codes that are not based on image data deemed to be un-suitable are assigned confidence values above zero (e.g., based on the angle of the face relative to the camera, based on an illumination level of the face of the person in the image data, or based on the size of the largest cluster). In other words, the processing circuitry may be configured to calculate a confidence value for (each of) the re-identification codes.

In some cases, privacy concerns may be raised regarding the automated tracking of persons. In particular, it is a finding that some re-identification systems may be retroactively abused if a given re-identification code is linked to an absolute identity of a person and that re-identification code remains the same across time and/or locations. Additional effort may thus be required to securely store and transmit the re-identification codes, e.g., using a strongly guarded and closed system, which may lead to additional implementation complexities, especially in systems with many cameras, where the re-identification codes are transmitted to a central server for re-identification. This additional effort may be avoided if known re-identification codes are not used directly, but instead transformed re-identification codes are used, which are based on a transformation function that can change over time and/or across locations. In other words, the plurality of re-identification codes may be a plurality of transformed re-identification code. Each transformed re-identification code may be based on a similarity-preserving transformation of a re-identification code that represents a person, with the re-identification codes being transformed based on a transformation parameter that is dependent on at least one of a time and a location. For example, the transformation may be infeasible to invert without knowledge of the transformation parameter, which may, in turn, be based on a cryptographic key. Accordingly, the circuitry may be configured to obtain transformed re-identification code, e.g., by transforming the received or generated re-identification codes, by receiving transformed re-identification codes, or by generating transformed re-identification codes in the first place. Accordingly, the method may comprise obtaining 110 transformed re-identification codes, transforming the obtaining 110 re-identification codes, or generating 120 transformed re-identification codes. These transformed re-identification codes are still suitable for re-identification, and also for matching the entry and exit of persons, but the danger that lies in a retroactive identification of the person may be avoided, as the transformation codes being generated may be designed to become dissimilar across time and/or location.

The retroactive identification may be thwarted by adding on top of an existing re-identification function a dynamically changing encryption layer (i.e. a transformation function) that maintains a so-called Equivalence Class Preserving (ECP) property, which can be an isometry property or an "(almost) distance-preserving" property, as the distance between transformed re-identification codes is at least similar, if not equal, to the distance between the re-identification codes that the transformed re-identification codes are based on. The ECP property is similar to properties of locality-sensitive hashing (LSH), and is described in the following.

In mathematical terms, f denotes an existing (traditional) re-identification system, that is used to generate the re-identification code. According to a pre-defined schedule, e.g. every day, or per location, a new secret key k is distributed to all devices (using, e.g., a traditional public key infrastructure). For example, the secret key k may be the transformation parameter, or k may be a cryptographic secret the transformation parameter is derived from. Let $e_k$ be a cryptographically secure, bijective transformation function with the ECP property, which is dependent on the shared secret key k. The final anonymous, dynamic re-identification function, $c_k$, which operates on the image I, is then given by the composition of the dynamic encryption layer $e_k$ and the existing re-identification function, f, i.e., $c_k(I)=e_k(f(I))$.

In the following, the assumption is made that the secret key is after each transit between two terminal station, or after each day, i.e. that the transformation function is based on time. Let $k_{t-1}$ denote the secret key from a first transit/day and let $k_t$ denote the secret key from a subsequent second transit/day. Every transit, all devices may make sure that the key from the first transit/day $k_{t-1}$ and thus the corresponding encryption function is securely destroyed (e.g. by overwriting the relevant memory and storage areas). Because keys are changed every transit/day, it may be impossible to compare re-identification codes across time. In effect, the following anonymous re-identification property is satisfied:

$$ck_t(I_1) \approx ck_t(I_2) \text{ and } ck_{t+1}(I_1) \approx ck_{t+1}(I_2)$$

but $$ck_t(I_1) \neq ck_{t+1}(I_2) \text{ and } ck_t(I_2) \neq ck_{t+1}(I_1).$$

In other words, the processing circuitry may be configured to transform the re-identification code such that, if the re-identification code is similar to a further re-identification code generated by a hashing algorithm (which may be ML-based) being used to generate the re-identification code according to the similarity metric, the transformed re-identification code is similar to a further transformed re-identification code being a transformed version of the further re-identification code. On the other hand, if the re-identification code is dissimilar to the further re-identification code generated by the hashing algorithm according to the similarity metric, the transformed re-identification code should be, or rather is, dissimilar to the further transformed re-identification code. In other words, the transformation may be performed such, that a subsequent re-identification is not skewed, and an equivalence class preserving property is satisfied. In more general terms, the processing circuitry may be configured to transform the re-identification code such, that a level of similarity between the re-identification code and the further re-identification code is equivalent to a level of similarity between the transformed re-identification code and the further transformed re-identification code, with the level of similarity being based on the similarity metric. For example, if the level of similarity is high, the two re-identification codes and the two transformed re-identification codes may be similar, respectively, and if the level similarity is low, the two re-identification codes and the two transformed re-identification codes may be dissimilar, respectively. The level of similarity may correspond to the distance between the re-identification code, with a higher level of similarity yielding a lower distance, and a lower level of similarity yielding a higher distance.

In various examples, the transformation function can be used to linearly transform the re-identification code. In other words, the processing circuitry may be configured to perform a linear transformation of the re-identification code based on the transformation parameter. One specific implementation of a linear transformation is a transformation that is based on a rotation matrix. In other words, the processing circuitry may be configured to transform the re-identification code using a rotation matrix, with the rotation matrix being based on the transformation parameter. In general, a rotation matrix is a matrix that is used to perform a rotation (e.g. of a vector) in a given coordinate space, by multiplying the vector with the rotation matrix.

Alternatively, the transformation functionality may be configured to perform a non-linear transformation of the re-identification code. For example, instead of a matrix multiplication, a more complex hash function may be employed. In some implementations, deep learning may be employed to create a more complex, more non-linear function (while still maintaining the equivalence class preserving property). In other words, the processing circuitry may be configured to perform the non-linear transformation using a machine-learning model. For example, the machine-learning model may take the re-identification code and the transformation parameter as an input, and provide the transformed re-identification code at an output.

In general, to thwart tracking of persons or objects over time and/or location, the transformation parameter, and therefore the transformation itself, is dependent on time and/or location. In general, the time may refer to the time the transformation of the re-identification code is performed, which may also be the time the image data is obtained, as the proposed system may be used for near-instantaneous generation and transformation of the re-identification code. On the other hand, the location may relate to a location the image data originates from. For example, a different transformation parameter may be used for every transit or every day (as an example of the transformation parameter being based on time). Additionally or alternatively, a different transformation parameter may be used for each transit line/route, or for different subsections of the transportation system (as an example of the transformation parameter being based on a location).

In general, there are various options for obtaining the suitable transformation parameters. For example, the transformation parameters may be generated by the computation device or evaluation device, i.e. by the processing circuitry, based on a cryptographic secret, which may be shared among computing devices/evaluation devices being configured to generate the same transformation parameters (e.g. dependent on time). In other words, the transformation parameter may be derived from a cryptographic secret. Accordingly, the processing circuitry may be configured to generate the transformation parameter, e.g. the rotation matrix, or an input parameter for the machine-learning model being employed to transform the re-identification code, based on the cryptographic secret and based on the time and/or the location. For example, the cryptographic secret may be used, together with the time and/or location, to generate a seed for generating pseudo-random numbers for the transformation parameter. For example, after the transformation parameter is changed, the previous transformation parameter is discarded or destroyed.

Using the collected (transformed) re-identification codes, the evaluation device matches the re-identification codes of persons entering to re-identification codes of persons exiting. In other words, the evaluation device creates matched pairs of re-identification codes, such that each matched pair of re-identification codes comprises a re-identification code of a person entering and a re-identification code of a person exiting. In particular, the matching is performed using a global matching scheme, which is based on reducing an overall distance between the re-identification codes of the matched pairs of re-identification codes over the plurality of matched pairs of re-identification codes. Accordingly, the circuitry may be configured to calculate the distance between the respective re-identification codes, e.g., by comparing the re-identification codes (according to the similarity metric). Additionally, the distance may be adjusted based on the confidences of the re-identification codes, and based on prior statistical knowledge related to traffic patterns between the points of entry and exit and/or time.

In literature, this matching is also denoted an "assignment", and the underlying problem is referred to as a Linear Assignment Problem (LAP). LAPs are usually addressed based on a so-called cost metric, which represents the (generally non-monetary) cost of an assignment/matching between two items. In the proposed system, the cost metric is constructed using the machine-learning based (facial) re-identification techniques, i.e., based on the distances between the re-identification codes, which may be combined with previously gathered statistical information. In particular, each pair of two re-identification codes may be associated with a cost value that is based on the distance between the re-identification codes of the pair, with the global matching scheme being based on reducing the overall sum of the cost values of the plurality of matched pairs of re-identification codes. The proposed concept is based on the combination of the machine-learning based techniques and the global matching (i.e., optimization scheme). It allows the system, due to a use of a global matching scheme, to correct previous matchings in hindsight when taking new observations into account. It also allows the proposed system to propose matchings even if entry- and/or exit measurements are missing.

One type of algorithms that is particularly suitable for solving (or addressing) a LAP are combinatorial optimization algorithms. A combinatorial optimization algorithm can optimize the assignment of entering people to exiting people based on all distances between all re-identification codes recorded within a timeframe safely longer than people would stay in the space in question. Combinatorial optimization algorithms are designed to select an optimal solution from a (finite) set of possible solutions. In other words, combinatorial optimization algorithms are usually based on finite sets of discretely definable possible solutions, from which one solution (i.e., the optimal solution) is picked. Such a combinatorial optimization algorithm may be applied to perform the global matching. In this context, the term "global matching algorithm" and "global matching" indicate, that the matching is not performed based on subsets of the plurality of re-identification codes, but by considering (all of) the (currently available/previously obtained) plurality of re-identification codes when determining the matching. In other words, the global matching scheme seeks to find a matching that provides the best overall matching (in terms of cost or distance), and not the best matching that is suitable for a smaller subset of the plurality of re-identification codes.

In general, the matching problem being combinatorically addressed can be represented as a graph, with two sets of vertices—a first set of vertices representing the re-identification codes of persons entering, and a second set of vertices representing the re-identification codes of persons exiting. Accordingly, the global matching scheme may be based on a graph-based algorithm. Edges may be inserted between a vertex of the first set and a vertex of the second set, but not between vertices of the same set, thus creating a bi-partite graph. The aim may be to find a set of vertices, such that all of (or at least as many as possible) of the vertices of the first set are connected, via an edge, to exactly one vertex of the second set (and vice versa). In other words, after running the algorithm, each vertex might only be connected to exactly one vertex of the respective other set. As an additional constraint, a re-identification code that represents a person entering can only be matched to a re-identification code of a person exiting if the re-identification code of the person exiting is generated/recorded after the re-identification code of the person entering.

For example, the so-called Hungarian algorithm (also known as the Kuhn-Munkres algorithm) may be used as global matching algorithm, i.e., the global matching scheme may be based on the Hungarian algorithm. The Hungarian algorithm is suitable for identifying the edges that lead to a perfect matching with minimum cost/minimal distance. Alternatively, other assignment algorithms for bipartite graph matching may be used, for example simplex methods, the Jonker-Volgenant algorithm or others.

In various examples, as outlined earlier, confidences and statistical knowledge may be used to provide an improved matching in cases where the re-identification codes being generated are based on image frames that are unsuitable or suboptimal for generating a re-identification code that is representative of the respective person. For example, a bus may start empty at the terminal at a given time and ends its drive empty one hour later. During the ride, passengers are entering and exiting. Every time a passenger either enters or exits, their corresponding re-identification code is recorded together with a corresponding confidence value (which may be zero if a particular generation of a re-identification code was unsuccessful or low if, e.g., the camera view of the passenger was temporarily obscured). When the ride is over, a matching algorithm then matches all re-identification codes recorded for people that entered during the one hour interval with all the recorded re-identification codes for people exiting during the same ride. In addition to using the raw confidences of the re-identification codes, other information can be included in the matching algorithm's input to be factored in such as prior known statistics, usual length of stay on the bus etc. For example, the metric may also allow for statistical prior knowledge to be factored in. In other words, the global matching scheme may be further based on prior statistical knowledge on the points of entry and exit, such as an overall average/mean number of stations being traveled, a most likely exit station for a given entry station (or vice versa) etc. The confidences of the re-identification codes and the prior statistical knowledge may be used to adapt the costs/distances of a matching. In other words, the distance and/or cost of a matched pair may be based on the confidence values of the two re-identification codes and based on the prior statistical knowledge (on prior transportation patterns between different stations).

For example, if the prior statistical knowledge indicates that a particular matching is more likely than average (e.g., because many persons travel between the stops being represented by the matching), the distance/cost of the matching may be decreased. On the other hand, if the prior statistical knowledge indicates that a particular matching is more likely than average (e.g., because only few persons travel between the stops being represented by the matching), the distance/cost may be increased. The recorded confidences may be taken into account to compute the most probably matching scenario even when confidences are low. For example, matches between re-identification codes with high confidences that have a low distance and/or cost may be fixed, as the likelihood that the "right" match has been identified is high. For the remaining re-identification codes between a first re-identification code having a high confidence value and a second re-identification code having a low confidence value, the distance/cost may be adapted based on the prior statistical knowledge.

The matches in turn are used to derive statistics about the transport routes that people are taking (i.e., how many people get on and off at specific locations/bus stops). To improve the quality of the statistics, matches between re-identification codes with a low confidence value, or also, more generally, matches having a low confidence value, may be omitted from the statistics. In various examples of the proposed concept, the system is configured to estimate a confidence of a given assignment, which may help dealing with "noisy" and inconsistent input data, e.g., from people are looking away from the camera, or from occlusions being caused by other people. For example, in addition to the confidences of the re-identification codes, confidences of the assignments/matches may be calculated. For example, confidences of each assignment/matching can be evaluated by solving the assignment problem again under the added constraint that the assignment in question is not permitted. The new solution will at best be as good as the original solution. A measure of confidence may be the difference in cost between the new solution and the old solution. When a confidence is assigned to each proposed match, it is possible to exclude low confidence data from statistical summaries.

In the following, an example is given on how the re-identification codes can be used to build a cost matrix that can be provided as input to the combinatorial matching algorithm, or, more generally, the global optimization scheme. FIGS. 4a and 4b show how the re-identification codes are used to build a cost matrix. FIG. 4a shows a timeline of an example of persons entering and exiting a transportation system. In the example of FIGS. 4a and 4b, four persons $n_1 \ldots n_4$ enter, and four persons $x_1 \ldots x_n$ exit. For each person entering or exiting, the re-identification code, together with the time and transportation station is recorded. FIG. 4b shows the corresponding cost matrix between the four persons $n_1 \ldots n_4$ entering and the four persons $x_1 \ldots x_n$ exiting. As persons $n_3$ and $n_4$ have entered after person $x_1$ has left, no cost is calculated, and the respective cells of the matrix connecting the respective persons remain empty, as the matching is forbidden. Similarly, as person $n_4$ has entered after person $x_2$ has left, no cost is calculated. The cells of the cost matrix show the cost of assigning $x_i$ to $n_j$ (i.e., the cost/distance of matching $x_i$ and $n_j$. A lower cost means a better match. For example, the cost/distance may be calculated by comparing the re-identification code and weighing in statistical prior knowledge based on time and location. The assignments giving the smallest over-all score are found by the linear assignment problem solver.

In general, the matching may be performed at any time. As outlined above, the matching may be performed after the transit between the two terminal stations, or after a day is completed. In some cases, however, it may be desirable to perform the matching as the re-identification code are added to the plurality of re-identification codes, e.g., to provide a real-time preview or tracking of traffic patterns, which can be used to make decisions regarding the number or carriages in subsequent vehicles, or regarding the frequency of vehicles. Therefore, the matching may be performed as soon as additional re-identification codes are obtained. In other words, the processing circuitry may be configured to update the matching of the plurality of re-identification codes based on the global matching scheme when a re-identification code is added to the plurality of re-identification codes. Accordingly, the method may comprise updating 165 the matching of the plurality of re-identification codes. As outlined above, the matching may be successively refined as additional re-identification codes are added.

The matching is performed to determine the points of entry and exit of the plurality of matched pairs of re-identification codes, and therefore of the persons being represented by the re-identification codes. In particular, the points of entry and exit may correspond to geographic locations or (identifiers of) transportation stations. In addition, a timestamp may be recorded with each point of entry and exit. For example, each re-identification code may be associated with a timestamp and/or location information. For example, the timestamp may relate to the time when the respective image data or the re-identification code has been generated. The location may relate to a geographic locations or to (an identifier of) a transportation station where the respective image data was generated. The processing circuitry may be configured to determine the time and/or location (i.e., the geographical location or the transportation station) of entry and exit for the plurality of matched pairs of re-identification codes. Accordingly, the method may comprise determining the time and/or location of entry and exit for the plurality of matched pairs of re-identification codes.

In some examples, as further shown in FIGS. 5a to 6b, it may be desirable to provide a visualization of the persons entering and exiting the transportation system, together with a visualization of the matching between said persons. Accordingly, the processing circuitry may be configured to generate a display signal comprising a visual representation of the matched pairs of re-identification codes. Accordingly, the method may comprise generating 180 the display signal. For example, as is shown in 4a, FIGS. 6a and 6b, the visual representation may comprise a first time timeline representing the points of entry, a second timeline representing the points of exit, and, optionally visual elements for linking the points of entry to the points of exit. For example, the points of entry and points of exit may be represented as points on the respective timelines. Colors may be used to visualize the re-identification codes, using a color scheme that assigns similar re-identification codes similar colors. In other words, each point may have a color that is derived from the re-identification code associated with the respective point. Additionally or alternatively, as will be shown in FIGS. 6a and 6b, points representing matched re-identification codes may be connected by a line.

Figure 5A:
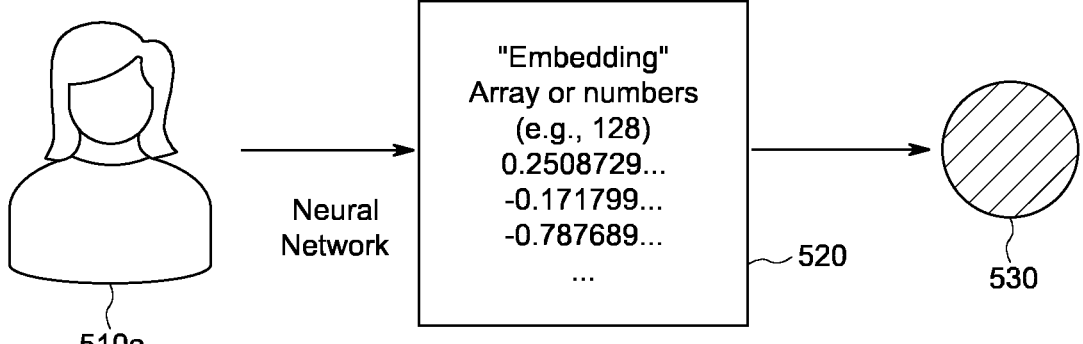
FIGS. 5a to 5c show examples of a generation of re-identification codes and of a visual representation of the re-identification codes.
Figure 5B:
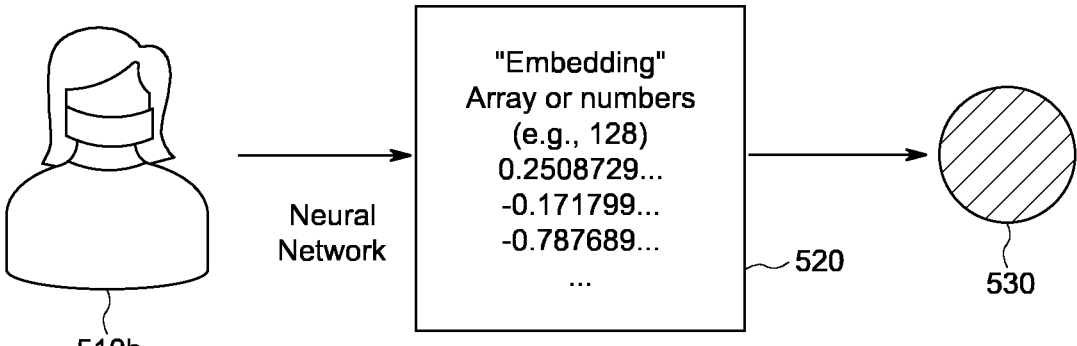
Figure 5C:
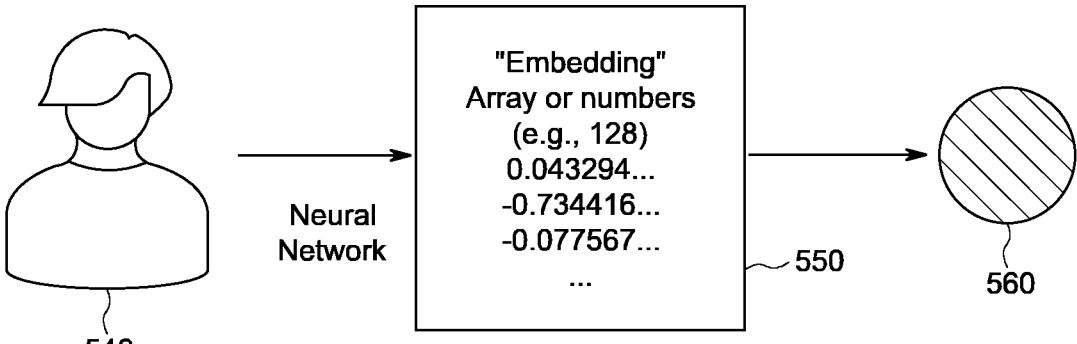

FIGS. 5a to 5c show examples of a generation of re-identification codes and of a visual representation of the re-identification codes. In FIGS. 5a to 5c, two different persons are shown. In FIG. 5a, a first person 510a is shown. A neural network is used for "embedding", i.e., for generating a re-identification code for the first person 510a, e.g., as an array of 128 (signed floating point) numbers 520. This re-identification code is transformed into a point 530 having a color that represents the re-identification code. In FIG. 5b, a re-identification code 520 is generated of the same person 510b, now wearing a mask. The re-identification code is the same, or at least similar, to the code being generated for the unmasked person 510a. Accordingly, the point 530 is generated with the same color. In FIG. 5c, a second person 540 is shown. A further re-identification code 550 is generated for the second person, with the further re-identification code being substantially different from the re-identification code representing the first person. Accordingly, a point 560 with a different color is generated.

Figure 6A:
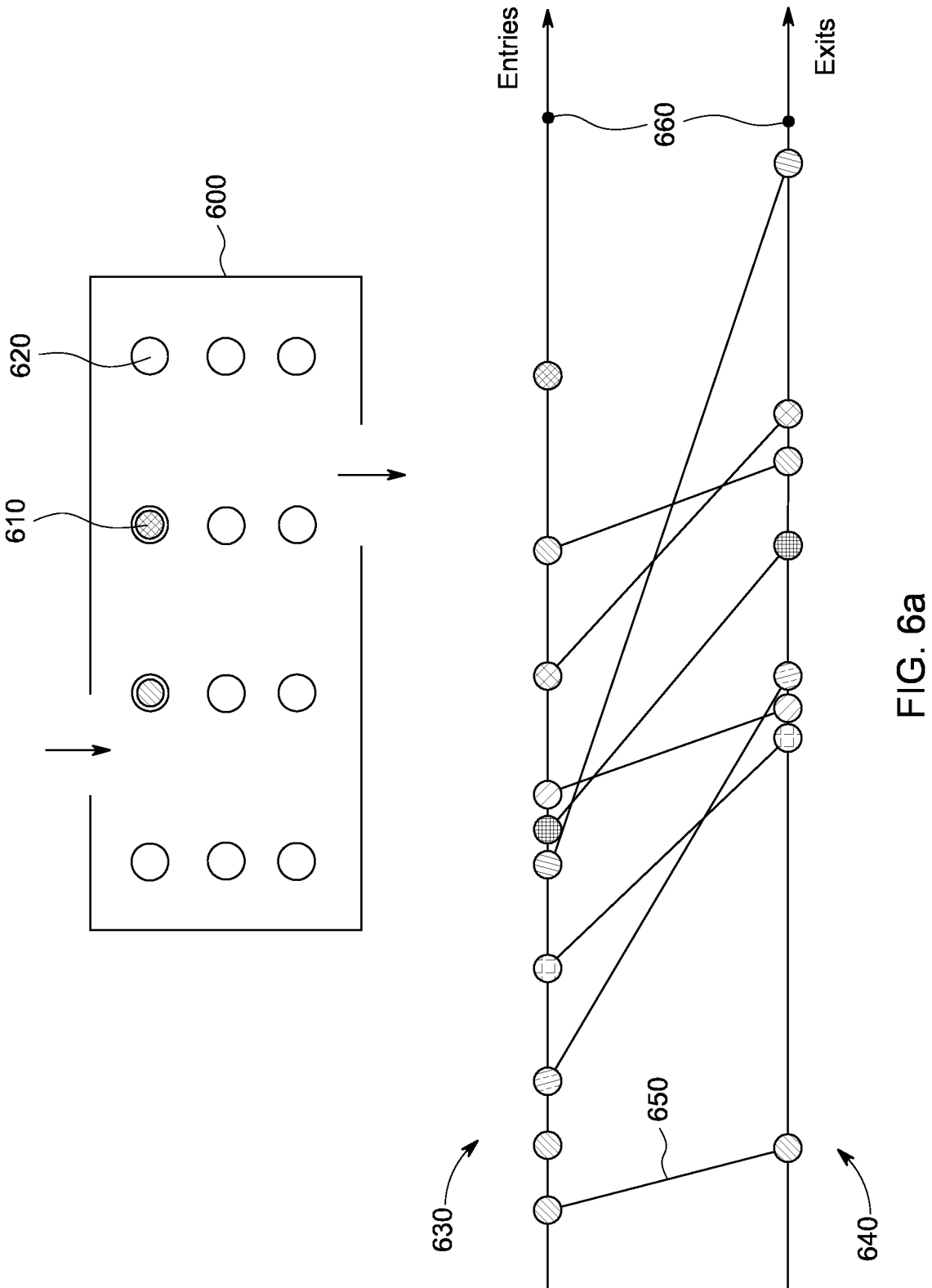
FIGS. 6a and 6b show examples of a visualization of persons entering and exiting a transportation system.
Figure 6B:
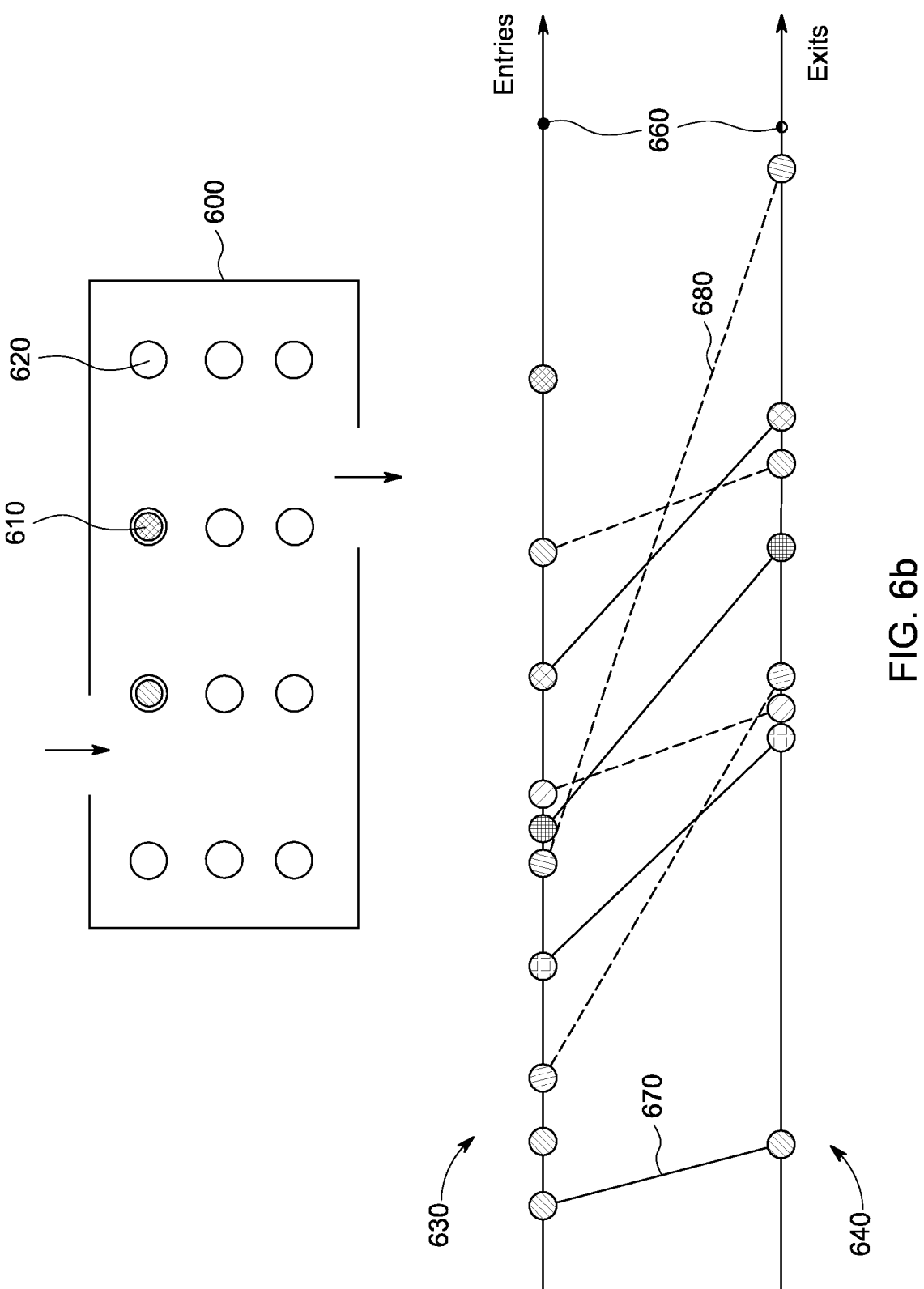

The above scheme may be used to generate points with corresponding colors that are placed on the respective timelines. FIGS. 6a and 6b show examples of a visualization of persons entering and exiting a transportation system. In FIGS. 6a and 6b, the transportation system is a single vehicle 600, such as a bus. Passengers 610 of the vehicle 600 are schematically assigned to locations 620 of the bus. Below the visualization of the vehicle, the two timelines are shown—a first timeline 630 for persons entering, and a second timeline 640 for persons exiting. On the timelines, the points representing the persons entering and exiting are shown, respectively, with different colors representing the different re-identification codes of the respective persons. In FIG. 6a, the matchings between the persons are shown as lines 650 connecting the points representing the persons. Towards the right, additional, smaller points 660 are shown that indicate the current progress on the timelines. For example, the timelines, and the respective matchings may be updated as soon as new persons enter or exit, thereby adding additional re-identification codes to the plurality of re-identification codes. In FIG. 6b, the confidence of the assignments/matchings is taken into accounts. Assignments/matchings having a higher confidence are shown with solid lines 670, while assignments/matchings having a lower confidence are shown with dashed lines 680. For example, a confidence threshold may be used to determine whether a solid or dashed line is to be used, or the ratio of solid to empty portions of the (dashed) lines may be chosen to represent the confidence. For example, assignments/matchings with a high confidence may be represented by quasi-solid lines, with assignments/matchings having a lower confidence showing larger gaps between the solid portions of the lines.

Various aspects of the proposed concept, such as the generation of the re-identification codes, or a non-linear transformation of re-identification codes, may be based on machine-learning. In general, machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information, or classification information, as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. In the concept presented in the present disclosure, machine learning may be used for two aspects—for non-linearly transforming re-identification codes, and for generating the re-identification codes in the first place.

Machine-learning models are trained using training data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training.

In general, the plurality of re-identification codes may be generated based on image data using a machine-learning model. This machine-learning model may implement the hashing function being used for generating the re-identification codes. One type of machine-learning algorithm being used to determine similarity between persons shown in image data is denoted triplet loss. In triplet loss, a baseline input is compared to a positive input and a negative input. For example, triplet loss may be used to train a machine-learning model for generating the re-identification codes.

A supervised-learning-based approach may be chosen to train a machine-learning model to be used for transforming re-identification code. For example, training data being used to perform the supervised learning-based training may comprise a plurality of re-identification codes and, additionally, a plurality of exemplary transformation parameters, as input data values, and a plurality of desired output values representing desired non-linear transformations of the plurality of re-identification codes in view of the plurality of exemplary transformation parameters.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In examples, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input. In at least some examples, the machine-learning model may be deep neural network, e.g. a neural network comprising one or more layers of hidden nodes (i.e. hidden layers), preferably a plurality of layers of hidden nodes. For example, if the triplet loss function is being used, the ANN may be a so-called Siamese Neural Network (SNN).

The proposed concept has been introduced with respect to its application on the tracking of passengers in transportation systems. Besides public transport vehicles, the proposed concept may be used in retail stores, private areas in airports and other delimited areas (e.g., compartments) where entry and exit routes are suitable for installation of a camera, e.g., to provide analytics for store managers. The proposed system outlined above may be applicable to any situation where statistics about people entering/exiting are desired.

Various examples of the present disclosure relate to computer vision and to visual person re-identification, e.g., using distributed, embedded camera-based systems.

The at least one interface 12 may correspond to one or more inputs and/or outputs for receiving and/or transmitting information, which may be in digital (bit) values according to a specified code, within a module, between modules or between modules of different entities. For example, the at least one interface 12 may comprise interface circuitry configured to receive and/or transmit information.

In various examples, the processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general purpose processor, a Digital Signal Processor (DSP), a micro-controller, etc.

In at least some embodiments, the one or more storage device 16 may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An evaluation device for person re-identification in a transportation system, the evaluation device comprising processing circuitry configured to:
    obtain a plurality of re-identification codes,
        wherein each re-identification code represents a person being recorded by at least one camera when entering or exiting respective points of entry and exit of at least a section of the transportation system,
    match the plurality of re-identification codes using a global matching scheme to obtain a plurality of matched pairs of re-identification codes, such that each matched pair of re-identification codes comprises a re-identification code of a person entering and a re-identification code of a person exiting,
        wherein the global matching scheme comprises solving a combinatorial optimization problem across the plurality of re-identification codes to minimize a total cost function defined over all pairs, wherein the total cost function is further adapted based on prior statistical knowledge on a plurality of journeys between the points of entry and exit; and
    determine matched points of entry and exit for the plurality of matched pairs of re-identification codes.

2. The evaluation device according to claim 1, wherein the global matching scheme is based on a combinatorial optimization algorithm.

3. The evaluation device according to claim 1, wherein the global matching scheme is based on a graph-based algorithm.

4. The evaluation device according to claim 1, wherein each pair of two re-identification codes is associated with a cost value that is based on the distance between the re-identification codes of the pair, wherein the global matching scheme is based on reducing the overall sum of the cost values of the plurality of matched pairs of re-identification codes.

5. The evaluation device according to claim 1, wherein each re-identification code is further based on one or more of facial features of the respective person, a gait of the person, an estimated age of the person, an estimated gender of the person, an estimated height of the person, an estimated length of body parts, and a clothing of the person.

6. The evaluation device according to claim 1, wherein each re-identification code is associated with a timestamp and/or location information, wherein the processing circuitry is configured to determine the time and/or location of entry and exit for the plurality of matched pairs of re-identification codes.

7. The evaluation device according to claim 1, wherein the processing circuitry is configured to update the matching of the plurality of re-identification codes based on the global matching scheme when a re-identification code is added to the plurality of re-identification codes.

8. The evaluation device according to claim 1, wherein the processing circuitry is configured to obtain image data of the at least one camera, and to generate the plurality of re-identification codes based on the image data.

9. The evaluation device according to claim 8, wherein the processing circuitry is configured to track persons over a plurality of frames of image data, to determine that a person is entering or exiting the transportation system based on the tracking of the person over the plurality of frames of image data, and to generate a re-identification code of the person upon determination of the person entering or exiting the transportation system.

10. The evaluation device according to claim 1, wherein the processing circuitry is configured to track persons over a plurality of frames of image data, and to generate the re-identification code of the person based on one of the frames of image data based on a suitability of the respective frame for the generation of a re-identification code.

11. The evaluation device according to claim 10, wherein the processing circuitry is configured to determine the suitability of the frames using a clustering algorithm.

12. The evaluation device according to claim 10, wherein the processing circuitry is configured to determine the suitability of the frames based on an angle of a face of the person relative to the at least one camera.

13. The evaluation device according to claim 1, wherein the transportation system is a single vehicle, wherein each re-identification code represents a person being recorded by a camera when entering or exiting the vehicle.

14. A method for person re-identification in a transportation system, the method comprising:
    obtaining a plurality of re-identification codes,
        wherein each re-identification code represents a person being recorded by at least one camera when entering or exiting respective points of entry and exit of at least a section of the transportation system;
    matching the plurality of re-identification codes using a global matching scheme to obtain a plurality of matched pairs of re-identification codes, such that each matched pair of re-identification code comprises a re-identification code of a person entering and a re-identification code of a person exiting,
        wherein the global matching scheme comprises solving a combinatorial optimization problem across the plurality of re-identification codes to minimize a total cost function defined over all pairs, wherein the total cost function is further adapted based on prior statistical knowledge on a plurality of journeys between the points of entry and exit; and
    determining matched points of entry and exit for the plurality of matched pairs of re-identification codes.

15. A non-transitory, computer-readable medium comprising a program code that, when the program code is executed on a processor, a computer, or a programmable hardware component, causes the processor, computer, or programmable hardware component to perform the method of claim 14.

16. An evaluation device for person re-identification in a transportation system, the evaluation device comprising processing circuitry configured to:
    obtain a plurality of transformed re-identification codes,
        wherein each transformed re-identification code is based on a similarity-preserving transformation of a re-identification code using a transformation parameter that is dependent on at least one of a time and a location, and wherein each re-identification code represents a person being recorded by at least one camera when entering or exiting respective points of entry and exit of at least a section of the transportation system, match the plurality of transformed re-identification codes that are based on the transformation parameter using a global matching scheme to obtain a plurality of matched pairs of transformed re-identification codes, such that each matched pair of transformed re-identification codes comprises a transformed re-identification code of a person entering and a transformed re-identification code of a person exiting, wherein the global matching scheme is based on reducing an overall distance between the transformed re-identification codes of the matched pairs of transformed re-identification codes over the plurality of matched pairs of transformed re-identification codes and further based on prior statistical knowledge on the points of entry and exit; and determine matched points of entry and exit for the plurality of matched pairs of transformed re-identification codes.

\* \* \* \* \*